Patented Apr. 16, 1946

2,398,430

UNITED STATES PATENT OFFICE 2,398,430

HYDROLYSIS OF HALOGEN CONTAINING COMPOUNDS

Robert M. Joyce, Jr., Marshallton, Del., assignor to E. I. du Pont de Nemours & Company, Wilmington, Del., a corporation of Delaware No Drawing. Application April 10, 1942, Serial No. 438,467

4 Claims. (Cl. 260—539)

This invention pertains to a process for preparing carboxylic acids. More particularly, it pertains to a process of preparing carboxylic acids from chlorinated hydrocarbons by hydrolysis.

In copending application, Serial No. 438,466, filed April 10, 1942, there is described a new process which is called telomerization. This telomerization process is applicable to many classes of compounds. In a specific embodiment of this process, chloroform can be reacted with polymerizable aliphatic monoolefinic hydrocarbons to produce chlorinated hydrocarbons having three chlorine atoms on the terminal carbon atom. Also, carbon tetrachloride can be reacted with polymerizable aliphatic monoolefinic hydrocarbons to produce chlorinated hydrocarbons having three chlorine atoms on one terminal carbon atom and one chlorine atom on the other terminal carbon atom. These two classes of compounds can be expressed by a single chain formula as follows:

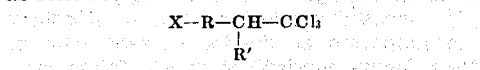

wherein X is hydrogen or chlorine, R is a divalent hydrocarbon radical, and R' is hydrogen or a hydrocarbon radical. It will be noted from the formula that these compounds all contain a trichloromethyl group and that this group is attached through a hydrogen-bearing carbon atom to a hydrocarbon radical.

Processes for hydrolyzing certain compounds containing the trichloromethyl group are well known. For example, benzotrichloride has been hydrolyzed to benzoic acid by heating with water, aqueous alkali, water in the presence of zinc chloride, sulfuric acid, heating with acetic acid or acetamide in the presence of zinc chloride, and by passing it with steam over stannic phosphate at 240° C. in the vapor phase. Likewise, another trichloromethyl compound having no hydrogen on the adjacent carbon, 1,1,1,2-tetrachloro-2-methylpropane, has been converted to alpha-chloro-isobutyric acid by heating with water at 180° C. (Willgerodt and Durr, J. prakt. Chem. 39, 284 (1889)).

It is also known that two-carbon trichloromethyl compounds bearing a hydrogen on the other carbon can be hydrolyzed to carboxylic acids in a number of ways. For example, unsymmetrical tetrachloroethane is converted to chloroacetic acid by heating with sulfuric acid in 90 per cent concentration at 150–200° C.; trichloroethylene reacts similarly (U. S. Patent No. 1,304,108). Pentachloroethane is transformed into dichloroacetic acid by heating with 88 to 97 per cent sulfuric acid at 168° C. (U. S. Patent No. 2,036,137). 1,1,1-trichloroethane can be hydrolyzed to acetic acid by heating with water at 150° C., by heating with water and concentrated sulfuric acid at 100° C. and to acetyl chloride by heating with water and ferric chloride at 150–160° C. (U. S. Patent No. 1,870,601).

The products derived by the dehydrohalogenation of some of these trichloromethyl compounds are equivalent to the parent trichloromethyl compounds with respect to hydrolysis to carboxylic acids; this is demonstrated by the equivalence of trichloroethylene and unsymmetrical tetrachloroethane (vide supra). That this is not strictly true, however, is illustrated by the following reaction carried out by Prins (Rec. Trav. Chim. 56, 779 (1937)).

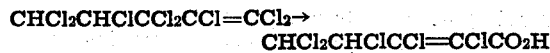

The reaction is carried out by heating the compound with concentrated sulfuric acid at 85° C.; in this case, simultaneous hydrolysis and rearrangement of the double bond occurs. The unpredictability of the course of hydrolysis of these heavily chlorinated hydrocarbons is further illustrated by the action of sulfuric acid on 1,1,1,2,3,3-hexachloropropane which, despite the fact that it contains a trichloromethyl group, is thereby hydrolyzed to $Cl_2C=CClCH=O$ (Prins, J. prakt. Chem. 89, 414 (1914)). Furthermore, the compound $(Cl_3CCHCl)_2CClCCl=CCl_2$ is inert to sulfuric acid despite the fact that it contains two trichloromethyl groups (Prins, Rec. Trav. Chim. 57, 659 (1938)).

It is an object of this invention to provide a new process for making carboxylic acids. Another object is to provide a process for making carboxylic acids from alpha-trichloro-methyl alkanes, alpha-trichloro-methyl-omega-chloro alkanes, and chlorinated olefines obtainable from these compounds. A further object is to discover a suitable method of hydrolyzing the said chlorinated alkanes and chlorinated olefines to carboxylic acids. Other objects will appear hereinafter.

By analogy to the previously mentioned types of trichloromethyl compounds, it should be expected that such materials could be readily hydrolyzed to the corresponding carboxylic acids in a number of ways. However, the surprising discovery has been made that compounds of this class are not at all analogous to the previously mentioned types of trichloromethyl derivatives in that the methods which have been previously used successfully do not lead to carboxylic acids when applied to the trichloromethyl derivatives with which this invention is concerned.

The dissimilarity of the compounds described in the present invention and the two-carbon trichloromethyl compounds is illustrated by a comparison of the behavior of the former with that of the 1,1,1-trichloroethane. This latter compound can be converted quantitatively to acetic acid by heating with water at 150° C. (U. S. Patent No. 1,870,601). Similar treatment of the trichloromethyl compounds to which the present invention applies, for example, 1,1,1-trichloropropane and 1,1,1-trichloropentane, results in the formation of 1,1-dichloropropene-1 and 1,1-dichloropentene-1, respectively, although the yield in the latter case is very poor since most of the trichloromethyl compound is unaffected. The above patent likewise describes the conversion of 1,1,1-trichloroethane to acetyl chloride by heating with a limited quantity of water in the presence of ferric chloride at 150–160° C. Such treatment of 1,1,1-trichloropentane, for example, results in the splitting out of hydrogen chloride to form 1,1-dichloropentene-1, without the formation of any other acidic products.

Furthermore, 1,1,1,2,3,3-hexachloropropene-2 can be treated with three molecules of sodium ethoxide and converted into $Cl_2C=CClC(OEt)_3$, which can then be hydrolyzed to trichloroacrylic acid. Similar treatment of trichloromethyl derivatives of the class hereinabove specified results in the formation of a dichloroolefin by the loss of one molecule of hydrogen chloride; no ortho ester is produced. This hexachloropropene can likewise be hydrolyzed to trichloroacrylic acid by heating with an aqueous suspension of barium carbonate. Such treatment likewise removes one molecule of hydrogen chloride from trichloromethyl compounds of the said class without the production of any acid derivatives. Such dehydrohalogenation is likewise observed in other procedures which have been used for the hydrolysis of benzotrichloride, such as by heating with water in the presence of zinc chloride, passing with water vapor over a catalyst at elevated temperature, and by heating with aqueous alkali. Similar results are also obtained by heating these compounds with aliphatic amides such as formamide and acetamide either with or without a zinc chloride catalyst. These reactions are disclosed in detail in copending application Serial No. 438,468, filed April 10, 1942.

The objects of the invention have been accomplished by the discovery that compounds containing a trichloromethyl group attached to an organic radical through a hydrogen-bearing carbon atom can be hydrolyzed to the corresponding carboxylic acid by treating them with water in the presence of concentrated sulfuric acid as is more fully described below. It has been further discovered that this procedure is applicable not only to these trichloromethyl compounds, but also to the products of their monodehydrohalogenation, which can be prepared according to copending Serial No. 438,468, filed April 10, 1942.

As this process is operated, water is the true hydrolytic agent and sulfuric acid is the catalyst. The hydrolysis is carried out by vigorously agitating a mixture of the trichloromethyl compound with about an equal weight of concentrated (96 per cent) sulfuric acid and heating to a temperature of about 95° C. A vigorous evolution of hydrogen chloride gas sets in. A slight excess of water over the two molecular equivalents theoretically required for the hydrolysis of the trichloromethyl group is then added to the reaction mixture. Although the water may be added as such, it is preferred to dilute it with about an equal volume of concentrated sulfuric acid in order to facilitate its introduction into the reaction mixture. This aqueous solution is best introduced under the surface of the reaction mixture. The addition of this water must be made sufficiently rapidly to insure that the water does not become completely depleted from the reaction mixture, and yet sufficiently slowly so that the sulfuric acid does not become too dilute to be effective as the hydrolysis catalyst; i. e., below about 85 per cent $H_2SO_4$. Obviously then, the rate at which the water must be added varies with the rate of hydrolysis of the trichloromethyl compound in question, and this, in turn, will vary with various types of derivatives. The rate of reaction can be simply determined by noting the rate at which hydrogen chloride is evolved from the reaction mixture after allowing a little time for the reaction mixture to become saturated. From this reaction rate, a simple calculation will indicate the rate at which water must be added to the reaction mixture to maintain the concentration of the sulfuric acid at a given value.

In general, the reaction proceeds quite rapidly, and hydrogen chloride evolution practically ceases shortly after all the water has been added to the reaction mixture. The carboxylic acid can be isolated from the reaction mixture in a number of ways. For example, the sulfuric acid mixture can be cooled, poured on ice and the free acid can be separated by filtration if it is solid, or by extraction with a suitable solvent if it is a liquid. If the acid is of sufficiently low molecular weight that it is volatile with steam, the reaction mixture can be diluted with a little water and the acid can be isolated directly therefrom by steam distillation.

Alternatively, it is sometimes desirable to isolate the acid in the form of an ester. This can be accomplished by diluting the sulfuric acid with water, then adding a suitable alcohol and heating with agitation to about 90–95° C. for a short period of time. The sulfuric acid catalyzes the esterification of the acid, and the corresponding ester can be isolated either by steam distillation directly from the reaction mixture or the mixture can be poured on ice, and the ester separated and purified by known procedures. Dilution of the crude reaction mixture with water prior to esterification is necessary to prevent otherwise substantial losses of alcohol through ether formation before esterification can occur.

The first step in the conversion of the trichloromethyl compounds into carboxylic acids by means of sulfuric acid and water appears to be the removal of a molecule of hydrogen chloride from the trichloromethyl compound to form a dichloroolefin with the structure of $R-CH=CCl_2$, where R is an organic radical. Instead of treating the trichloromethyl compound directly with sulfuric acid, it is sometimes advantageous to dehydrohalogenate the trichloromethyl compound to form a dichloroolefin and use the preformed dichloroolefin in the hydrolysis. The dehydrohalogenation can be done by any suitable process, such, for example, as any of the several procedures described in copending application Serial No. 438,468, filed April 10, 1942, such as vapor phase dehydrohalogenation over a catalyst, liquid phase catalytic dehydrohalogenation with a Friedel-Crafts type catalyst, etc. The dehydrohalogenation product can then be hydrolyzed to the corresponding carboxylic acid by a procedure similar to that outlined above. This two-step process has the advantage that less stringent conditions are required for the hydrolysis of the dichloro-olefins resulting from dehydrohalogenation than are required for the hydrolysis of the trichloromethyl compounds. One reason for this is that the dichloro-olefins have an appreciable solubility in concentrated sulfuric acid in contrast to the trichloromethyl compounds.

It has been pointed out that the sulfuric acid must be at least 85 per cent $H_2SO_4$ to function effectively as a catalyst for the hydrolysis. When the trichloromethyl compounds are heated with more dilute sulfuric acid, they are dehydrohalogenated to dichloroolefines, but the reaction stops at this point. The strong sulfuric acid is necessary to catalyze the addition of water to the resulting double bond, which is the first step in the true hydrolytic reaction.

On the other hand, the reaction is more sensitive than the corresponding hydrolysis of certain heavily chlorinated hydrocarbons. For example, concerning the sulfuric acid hydrolysis of $CHCl_2CHClCCl_2CCl=CCl_2$ to a pentachlorobutene carboxylic acid, Prins (Rec. Trav. Chim. 56, 779 (1937)) points out that the reaction goes to completion even if the sulfuric acid does not contain sufficient water for the formation of all the hydrogen chloride; he mentions the formation of $SO_3$ under such conditions whence it is evident that the hydrolysis of such compounds may even involve the decomposition of $H_2SO_4$ to $SO_3$ and $H_2O$. Such is not the case with the present process, for it has been found that when the free $H_2O$ has been removed from the sulfuric acid by the hydrolysis reaction, the reaction begins to take a different course with the production of water-soluble materials, probably sulfonic acids. Accordingly, for the successful operation of the process of the present invention, the concentration of sulfuric acid in the catalyst must be maintained between about 85 per cent and about 99 per cent.

In order that the process may be more fully understood, the following specific examples are given by way of illustration, but the invention is not limited thereto as will become more apparent hereinafter.

*Example I*

A mixture of 1260 parts by weight of 1,1,1,5-tetrachloropentane (one of the products of the telomerization of ethylene with carbon tetrachloride) and 1500 parts by weight of concentrated (96 per cent) sulfuric acid is stirred vigorously and heated to 90–95° C. on the steam bath. A vigorous evolution of hydrogen chloride sets in. A solution of 180 parts by weight of water and 330 parts by weight of concentrated sulfuric acid is then added slowly under the surface of the reaction mixture over a period of one hour. After maintaining the heating and stirring for an additional hour, the reaction mixture is cooled and poured on 2500 parts by weight of cracked ice. The crude separated acid is extracted with three portions of carbon tetrachloride, each consisting of 800 parts by weight. The resulting carbon tetrachloride solution is separated, washed well with water and the carbon tetrachloride is then removed in a stripping still. The resulting product is purified by distillation through a precision still, and there is obtained 639 parts by weight of 5-chlorovaleric acid boiling at 128–131° C./11 mm.

*Example II*

1,9-bis-(trichloromethyl)-5-thianonane is prepared by the action of sodium sulfide on 1,1,1,5-tetrachloropentane in aqueous alcoholic solution. A mixture of 35 parts by weight of the crude product from this reaction with 90 parts by weight of 96 per cent sulfuric acid is stirred and heated on a steam bath while a solution of 10 parts by weight of water in 18 parts by weight of sulfuric acid is added over a period of 10 minutes. The reaction mixture is stirred an additional hour and a half, when the evolution of hydrogen chloride has ceased entirely. The reaction mixture is cooled and poured on ice. The resulting acid is a solid which is separated by filtration and purified by recrystallization from benzene or water. The product, 6-thiaundecane-1,11-dioic acid $(HO_2C(CH_2)_4S(CH_2)_4CO_2H)$, is a white crystalline solid melting at 95–96° C. and having a neutral equivalent of 117.

*Example III*

1,1,5-trichloropentene-1 is prepared by heating 1,1,1,5-tetrachloropentane at 110–120° C. in the liquid phase with zinc chloride catalyst in the presence of a little acetic acid, as described in copending application Serial No. 438,468, filed April 10, 1942, reference to which is here made.

For example, a mixture of 42 parts by weight of 1,1,1,5-tetrachloropentane, 0.5 part by weight of anhydrous zinc chloride, and 12 parts by weight of glacial acetic acid is stirred and heated at 110–120° C. for 3 hours. At the end of this time, the evolution of hydrogen chloride has practically ceased, and the mixture is decanted from the gummy catalyst and distilled directly. After distillation of the acetic acid, there is collected 27 parts by weight (80.6 per cent of the theoretical) of 1,1,5-trichloropentene-1 which is a colorless liquid boiling at 89° C./23 mm. and having an $n_D^{25}$ of 1.4878 and a $d_4^{25}$ of 1.2893.

A mixture of 50 parts by volume of this trichloropentene (B. P. 89° C./23 mm.), 10 parts by volume of water, and 250 parts by volume of 96 per cent sulfuric acid is heated and stirred vigorously on the steam bath for one hour. The reaction mixture is then cooled and diluted with 120 parts by volume of water and 120 parts by volume of methanol. The resulting mixture is stirred on the steam bath for an additional two hours, then cooled, and poured on ice. The product is extracted with benzene, washed with water, dilute sodium carbonate solution, water, and saturated calcium chloride solution, and dried over anhydrous magnesium sulfate. After removal of the solvent by distillation, the product is distilled through a precision still, and there is obtained a good yield of methyl 5-chlorovalerate which is a colorless liquid boiling at 77° C./10 mm., and having an $n_D^{25}$ of 1.4360.

*Example IV*

A mixture of 50 parts by volume of 1,1,1-trichlorononane (one of the products of the telomerization of ethylene and chloroform) and 500 parts by volume of 96 per cent sulfuric acid is stirred vigorously and heated on a steam bath for 1½ hours. The reaction mixture is cooled, poured on ice, and the product is extracted with ether. The ether solution is dried over anhydrous magnesium sulfate, and subsequent evaporation of the ether leaves essentially pure pelargonic (n-nonanoic) acid which was identified by conversion into its p-bromophenacyl ester (M. P. 62.5–63.5° C. as compared with 63.5–64° C. for an authentic sample; mixed M. P. 62.5–64° C.).

The process of the present invention has been shown to be applicable to compounds containing a trichloromethyl group which is attached through a hydrogen-bearing carbon atom to an organic radical. The general formula for such compounds can be represented as

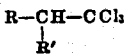

wherein R is an organic radical and R' is selected from the group consisting of hydrogen and hydrocarbon radicals, and monodehydrochlorination products of such compounds, which process comprises contacting any of said organic compounds with sulfuric acid having a concentration of between 85 and 99 per cent and maintaining the concentration of sulfuric acid between the said limits while the reaction is in progress by adding water to the reaction mass.

Preferably, the radical R has from three to twelve carbon atoms and is an aliphatic hydrocarbon radical as in, for example, $CH_3CH_2CCl_3$ and

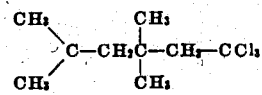

or an aliphatic hydrocarbon radical terminally substituted by a group which is inert to the hydrolysis conditions such as chlorine, carboxyl, amino, etc., as in, for example, $Cl(CH_2)_6CCl_3$, $HO_2C(CH_2)_6CCl_3$, and $H_2N(CH_2)_8CCl_3$. However, it is within the scope of the invention to use compounds in which the radical R contains a terminal substituent which is not inert to the hydrolytic conditions. As examples of such substituents, there can be mentioned a trichloromethyl group which is attached to a hydrogen-bearing carbon atom (as in Example II), an ester or amide group which would be hydrolyzed, and an alcohol group which would be sulfated as in, for example, $Cl_3C(CH_2)_8CCl_3$, $$CH_3\overset{O}{\underset{\|}{C}}-O(CH_2)_4CCl_3$$

and $HO(CH_2)_8CCl_3$. The invention is also applicable to compounds in which the R contains a chain of atoms consisting of carbon atoms and one or more hetero atoms, so long as these atoms are combined in such a way that their linkage is not affected by the hydrolysis conditions. As examples of such, there can be mentioned hetero sulfur linked as monosulfide, as disulfide, and as sulfone; hetero oxygen linked as ether and hetero nitrogen linked as amine such as in, for example, $Cl_3C(CH_2)_6S(CH_2)_6CCl_3$, $C_2H_5S(CH_2)_4CCl_3$, $CH_3SO_2(CH_2)_4CCl_3$, $C_2H_5O(CH_2)_4CCl_3$, and

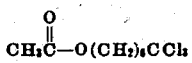

The R may also be an aryl radical as in, for example,

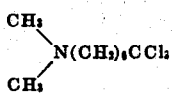

or a mixed aryl-aliphatic radical as in

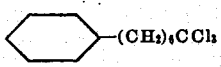

In such cases, the hydrolysis of the trichloromethyl group may be accompanied by sulfonation of the aromatic ring, but this circumstance does not exclude such compounds from the scope of this invention. It is apparent, therefore, that the primary consideration is that the trichloromethyl group be attached to an organic radical through a hydrogen-bearing carbon atom. R' can be hydrogen or a hydrocarbon radical, for example as in

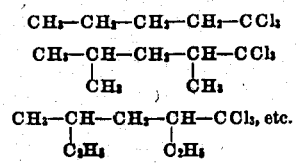

As already indicated, the trichloromethyl compound can be converted into a dichloro-olefin by dehydrohalogenation prior to hydrolysis. Suitable methods by which this can be effected are taught in copending application Serial No. 438,468, filed April 10, 1942. As examples of such, there may be mentioned dehydrohalogenation in the vapor phase in the presence of water vapor over a hetero polyacid catalyst (e. g., phosphotungstic acid) at 300° C. The dehydrohalogenation can also be effected in the liquid phase by heating with a halide-type Friedel-Crafts catalyst in the presence of water or acetic acid. The resulting dichloro-olefin can be used in place of the trichloromethyl compound as the raw material in the hydrolytic process of this invention.

It has previously been pointed out that the concentration of the aqueous sulfuric acid in the reaction mixture should be maintained between about 85 and 99 per cent. The amount of sulfuric acid used can vary broadly from about 0.1 to at least 50 molecular equivalents, based on the trichloromethyl compound. There is no upper limit to the amount of sulfuric acid used, in so far as the operability of this process is concerned. From a practical standpoint, however, it is preferred to operate with from 1 to 5 molecular equivalents of sulfuric acid, based on the trichloromethyl compound.

The hydrolysis often proceeds at room temperature, e. g., 25° C., especially if the starting material is soluble in the sulfuric acid mixture. It is preferred to operate at about 100° C., and it is preferred not to operate above about 125° C. in order to avoid excessive side reactions.

The hydrolysis process can be operated batchwise, or, if desired, in semicontinuous or continuous flow operation. For example, a mixture of the trichloromethyl compound with sulfuric acid can be passed through a heated reaction zone provided with suitable means for agitating the reaction mixture, while water, either alone or admixed with sulfuric acid, is injected into the reaction mixture at suitable locations and at a suitable rate. If a large molecular equivalent of 85 to 99 per cent sulfuric acid is initially used, there can be enough water present so that it may not be necessary to add water during the course of the hydrolysis.

The carboxylic acids which can be prepared according to this invention are very desirable intermediates for many chemical syntheses. For example, 5-chloro-valeric acid can be converted into delta valerolactone by heating a solution of the sodium salt of the acid in water or methanol. Delta valerolactone is of value because it can be polymerized to a waxy solid and can be interpolymerized with other polymer-forming compositions, e. g., with diamine-dibasic acid salts to form polyester amides. Another use for the acids produced by this invention is in the preparation of dibasic acids. For example, the omega-chloro acids can be converted by reaction with an alkali cyanide to omega-cyano acids and thence, by hydrolysis, to the corresponding alpha-omega-dicarboxylic acids which are useful for many purposes, e. g., in the preparation of resins, plasticizers, and nylon. The foregoing are but a few of a wide variety of applications of these acids which will be apparent to those versed in the art.

It is apparent that many widely different embodiments of this invention may be made without departing from the spirit and scope thereof, and, therefore, it is not intended to be limited except as indicated in the appended claims.

I claim:

1. A process for the production of a carboxylic acid of the formula $Cl(CH_2)_n-CH_2-COOH$ wherein $n$ is an integer between 3 and 12 from an organic compound of the formula $$Cl(CH_2)_n-CH_2-CCl_3$$

wherein $n$ is an integer between 3 and 12 which comprises bringing said organic compound in contact at 25–125° C. with sulfuric acid between 85 and 99% concentration and maintaining the concentration of the sulfuric acid within said limits while the reaction is in progress.

2. A process for the production of 5-chlorovaleric acid which comprises contacting 1,1,1,5-tetrachloropentane with 96 per cent sulfuric acid at 90–95° C. and maintaining the concentration of sulfuric acid between 85 and 99 per cent while the reaction is in progress by adding water to the reaction mass.

3. A process for the production of 5-chlorovaleric acid which comprises contacting 1,1,1,5-tetrachloropentane with sulfuric acid having a concentration of between 85 and 99 per cent at a temperature of between 25° C. and 125° C. and maintaining the concentration of sulfuric acid within said limits while the reaction is in progress by adding water to the reaction mass.

4. A process for the production of 7-chloroheptanoic acid which comprises contacting 1,1,1,7-tetrachloroheptane with sulfuric acid having a concentration of between 85 and 99 per cent at a temperature of between 25° C. and 125° C. and maintaining the concentration of sulfuric acid within said limits while the reaction is in progress by adding water to the reaction mass.

ROBERT M. JOYCE, Jr.